United States Patent
Song et al.

(10) Patent No.: US 12,134,221 B1
(45) Date of Patent: Nov. 5, 2024

(54) ON-ORBIT COMPOSITE FILAMENT FORMING DEVICE FOR SPACE 3D PRINTING

(71) Applicant: NANJING UNIVERSITY OF AERONAUTICS AND ASTRONAUTICS, Nanjing (CN)

(72) Inventors: Wenzhe Song, Nanjing (CN); Congze Fan, Nanjing (CN); Jinghua Zheng, Nanjing (CN); Yiwei Chen, Nanjing (CN); Jingxuan Wang, Nanjing (CN); Zhongde Shan, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/777,503

(22) Filed: Jul. 18, 2024

Related U.S. Application Data (63) Continuation of application No. PCT/CN2024/079232, filed on Feb. 29, 2024.

(30) Foreign Application Priority Data

Mar. 3, 2023 (CN) .......................... 202310195108.X (51) Int. Cl.
  *B29C 48/05* (2019.01)
  *B29B 15/14* (2006.01)
  (Continued)

(52) U.S. Cl.
  CPC .............. *B29C 48/05* (2019.02); *B29B 15/14* (2013.01); *B29C 48/28* (2019.02); *B29C 48/885* (2019.02);
  (Continued)

(58) Field of Classification Search
  CPC ....... B29C 64/314; B29B 15/12; B29B 15/14; B33Y 40/10
  (Continued)

(56) References Cited

U.S. PATENT DOCUMENTS

2014/0212650 A1  7/2014  Johnson et al.
2020/0346398 A1* 11/2020 Guillemette .......... B29C 64/118

FOREIGN PATENT DOCUMENTS

CN   112477117 A      3/2021
CN   112847923 A  *  5/2021  ........... B29B 15/125
(Continued)

OTHER PUBLICATIONS

Vatanda, Bahri Bar, et al. "Additive manufacturing of PEEK-based continuous fiber reinforced thermoplastic composites with high mechanical properties." Composites Part A: Applied Science and Manufacturing 167 (2023): 107434. (Year: 2023).*

(Continued)

*Primary Examiner* — Seyed Masoud Malekzadeh
*Assistant Examiner* — Vipul Malik
(74) *Attorney, Agent, or Firm* — Bayramoglu Law Offices LLC (57) ABSTRACT

An on-orbit composite filament forming device for space 3D printing includes a constant tension unwinding module, a replaceable resin filament rotary wrapping module, a melt preheating chamber, a curved channel impregnation chamber, a variable aperture resin recovery device, a heat protective housing, a convective cooling device, a traction device, and a winding device. The replaceable resin filament rotary wrapping module wraps a resin filament on a surface of a carbon fiber by circumferential rotation and is provided with an active unwinding reel placed on a circular rail centered on the carbon fiber; the melt preheating chamber is used for melting resin to wrap the surface of the fiber, and (Continued)

is equipped with a lifting device for automatic opening and closing; the curved channel impregnation chamber is formed with a wedge-shaped high-pressure impregnation zone by mutual extrusion of upper and lower pressure blocks, thereby improving the quality of fiber impregnation.

6 Claims, 6 Drawing Sheets

(51) Int. Cl.
    *B29C 48/28*     (2019.01)
    *B29C 48/88*     (2019.01)
    *B29C 48/885*     (2019.01)
    *B29C 64/314*     (2017.01)
    *B29C 70/52*     (2006.01)
    *B29K 105/08*     (2006.01)
    *B29K 307/04*     (2006.01)
    *B33Y 40/10*     (2020.01)
    *B33Y 70/10*     (2020.01)
    *B29K 71/00*     (2006.01)

(52) U.S. Cl.
    CPC .......... *B29C 48/911* (2019.02); *B29C 64/314* (2017.08); *B29C 70/523* (2013.01); *B29C 70/525* (2013.01); *B33Y 40/10* (2020.01); *B33Y 70/10* (2020.01); *B29K 2071/00* (2013.01); *B29K 2105/08* (2013.01); *B29K 2307/04* (2013.01)

(58) Field of Classification Search
    USPC ............ 264/171.13, 171.14, 171.23, 171.24, 264/171.25, 172.15; 425/505, 66, 112, 425/383, 110
    See application file for complete search history.

(56) References Cited

FOREIGN PATENT DOCUMENTS

| | | |
|---|---|---|
| CN | 116238188 A | 6/2023 |
| WO | 2019114709 A1 | 6/2019 |

OTHER PUBLICATIONS

Chen, Yiwei, et al. "Preparation of CCF/PEEK filaments together with property evaluation for additive manufacturing." Composite Structures 281 (2022): 114975. (Year: 2022).*

Yu, Liguo, et al. "Impregnation modeling and preparation optimization of continuous glass fiber reinforced polylactic acid filament for 3D printing." Polymer Composites 42.11 (2021): 5731-5742. (Year: 2021).*

* cited by examiner

ON-ORBIT COMPOSITE FILAMENT FORMING DEVICE FOR SPACE 3D PRINTING

CROSS REFERENCE TO THE RELATED APPLICATIONS

This application is the continuation application of International Application No. PCT/CN2024/079232, filed on Feb. 29, 2024, which is based upon and claims priority to Chinese Patent Application No. 202310195108.X, filed on Mar. 3, 2023, the entire contents of which are incorporated herein by reference.

TECHNICAL FIELD

The present invention belongs to the technical field of continuous fiber reinforced thermoplastic composites, and particular relates to an on-orbit composite filament forming device for space 3D printing.

BACKGROUND

With the gradual development of space technology, deep-space exploration technology, and moon and Mars exploration technology, it is gradually difficult for conventional ground-based launch and transport methods to meet the requirements of complex space environments, on-orbit manufacturing technology has increasingly become a front hot issue in space technology research, 3D printing technology with advantages of high forming freedom and small equipment size has become a preferred solution for on-orbit manufacturing technology, and composite additive manufacturing technology with excellent characteristics of low power and high product strength perfectly conforms to the requirements of on-orbit manufacturing for equipment operating power and member strength. At present, the on-orbit composite additive manufacturing technology still adopts the solution of ground-to-air transportation of filaments and space printing. However, different use requirements of space environments also have different requirements for material types and components. The ground-to-air transportation of filaments greatly limits the development of composite additive manufacturing technology in the field of aerospace. On-orbit composite filament forming provides a new solution to address material limitations of the composite additive manufacturing technology. As a result, conventional forming methods based on resin particle transportation and natural filament cooling cannot be applied to on-orbit micro-gravity environments. Meanwhile, conventional extensive impregnation and high manual intervention impregnation modes also cannot be used for space environments. Therefore, it is important and difficult in this field to design a filament forming device suitable for micro-gravity environments, with good closure and material recycling capability.

SUMMARY

To solve the above problems, the present invention discloses an on-orbit composite filament forming device for space 3D printing, including a constant tension unwinding module, a replaceable resin filament rotary wrapping module, a melt preheating chamber, a curved channel impregnation chamber, a variable aperture resin recovery device, a heat protective housing, a convective cooling device, a traction device, and a winding device; the replaceable resin filament rotary wrapping module wraps a resin filament on a surface of a carbon fiber by circumferential rotation and is provided with at least one active unwinding reel placed on a circular rail centered on the carbon fiber, and the circular rail can rotate at various speeds to accurately control the quantity of the resin filament wrapped on the carbon fiber; the melt preheating chamber is used for melting resin to wrap the surface of the fiber, and is equipped with a lifting device for automatic opening and closing; the curved channel impregnation chamber is formed with a wedge-shaped high-pressure impregnation zone by mutual extrusion of upper and lower pressure blocks, thereby improving the quality of fiber impregnation; the variable aperture resin recovery device adopts gradient-adjustable metal scrapers to scrape excess resin from the surface of the filament, and stores the resin; the heat protective housing isolates heat paths of the melt preheating chamber, the curved channel impregnation chamber, and the variable aperture resin recovery device, thereby avoiding affecting the temperature of a space environment.

Further, a mechanical lifting device is provided above the melt preheating chamber and connected to an upper cavity of the melt preheating chamber; a plurality of first heating resistors are provided in the melt preheating chamber.

Further, the curved channel impregnation chamber includes a channel top plate, an upper pressure block, a lower pressure block, and a channel bottom plate from top to bottom, the upper and lower pressure blocks extruding each other to form the wedge-shaped high-pressure impregnation zone, wherein a plurality of channel heating resistors are placed in the upper and lower pressure blocks to maintain the internal temperature of a channel; a primary lifting device is connected to the channel top plate to lift a whole upper part of the channel, and a secondary lifting device is connected to the upper pressure block to press the melted filament to form the channel. The secondary lifting device functions to press the pressure blocks, that is, the primary lifting device is raised to expose the channel structure, and the filament is placed inside; the primary lifting device is lowered to close a melting cavity of the device, and the filament inside is in a straight state; the secondary lifting device is lowered, and the pressure blocks form the channel to bend the filament to an S shape.

Further, a first metal scraper opening and closing mechanism, a second metal scraper opening and closing mechanism, and a third metal scraper opening and closing mechanism have a same structure and an opening and closing diameter in a range of 0-1.5 mm, and the diameters of openings of the metal scraper mechanisms decrease sequentially along a direction of movement of the filament in the process of filament forming, wherein a plurality of rotating blades are provided inside the first metal scraper opening and closing mechanism, tail ends of the rotating blades are respectively connected to first rotating shafts and second rotating shafts capable of sliding in corresponding rails, the first rotating shafts are jointly connected to a rotary connecting rod, the rotation of the rotary connecting rod can drive the first rotating shafts to move in the slide rails, and the second rotating shafts also move in the corresponding slide rails due to the constraints of movement conditions, thereby driving the rotating blades to rotate relative to themselves, and realizing opening and closing functions.

Further, the variable aperture resin recovery device includes at least three rotatable opening and closing metal scrapers having an opening and closing diameter in a range of 0-1.5 mm, wherein the range includes 0, 0.6, 0.7, 0.8, 0.9, 1.0, 1.2, 1.3, 1.4, or 1.5 mm, the variable aperture resin recovery device is provided with rails in the filament forming direction, the rotatable opening and closing scrapers are movable along the rails, and an opening and closing controllable filament mold nozzle is provided at a front end of the variable aperture resin recovery device to control the formation of the recovered filament and the storage of the recovered resin.

A fan is provided on the convective cooling device to provide convection. The fan is used to overcome gravity-free convection caused by micro-gravity in the space environment. The traction device cooperates with the winding device to complete winding of the fabricated filament.

The replaceable resin filament rotary wrapping module of the present invention effectively solves the problem of difficult transportation of resin particles in the micro-gravity space environment, and provides an effective solution for space filament forming. Meanwhile, the rotary wrapping can also achieve the effect of accurate control on the content of resin/fibers by increasing or decreasing resin trays and adjusting the rotational speed, which has obvious technical advantages over the conventional screw speed control method. The curved channel impregnation chamber adopts two stages of lifting devices, which balance threading convenience and possible brittle breakage of the non-melted resin filament due to large deformation in the channel. The variable aperture resin recovery device facilitates the adjustment on the diameter of the filament, and can also store and recycle excess resin to perfectly meet the use requirements for high material utilization in space environments.

Beneficial effects of the present invention are as follows:

The replaceable resin filament rotary wrapping module effectively solves the problem of difficult transportation of resin in the micro-gravity environment, and a control method for quantitatively regulating the fiber content of a filament by controlling the quantity of unwinding rolls in the wrapping module is provided.

The curved channel impregnation chamber adopts two stages of lifting devices.

The variable aperture resin recovery device integrates a variety of functions such as filament diameter control, resin waste collection, and resin waste recycling.

The convective cooling device overcomes the problem of filament cooling without natural convection in the micro-gravity environment.

DETAILED DESCRIPTION OF THE EMBODIMENTS

The present invention will be further illustrated below in conjunction with the accompanying drawings and specific embodiments. It should be understood that the following specific embodiments are only used for describing the present invention, rather than limiting the scope of the present invention. It should be noted that the terms "front", "rear", "left", "right", "upper", and "lower" used in the following description refer to the directions in the drawings, and the terms "inside" and "outside" refer to a direction toward or away from a geometric center of a specific component separately.

Figure 1:
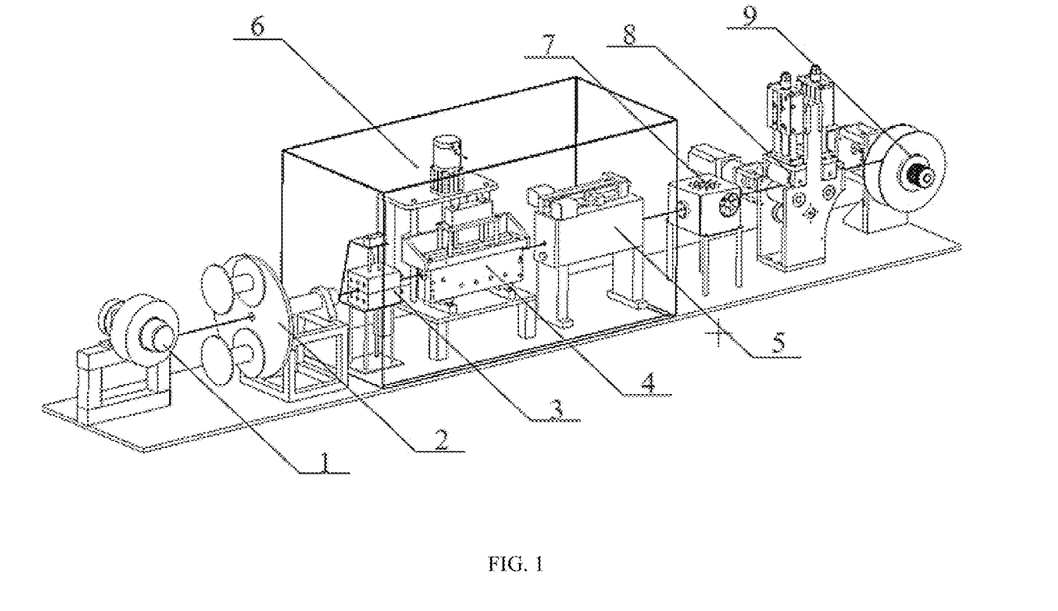
FIG. 1 is a schematic structural diagram of an on-orbit composite filament forming device for space 3D printing.
Figure 2:
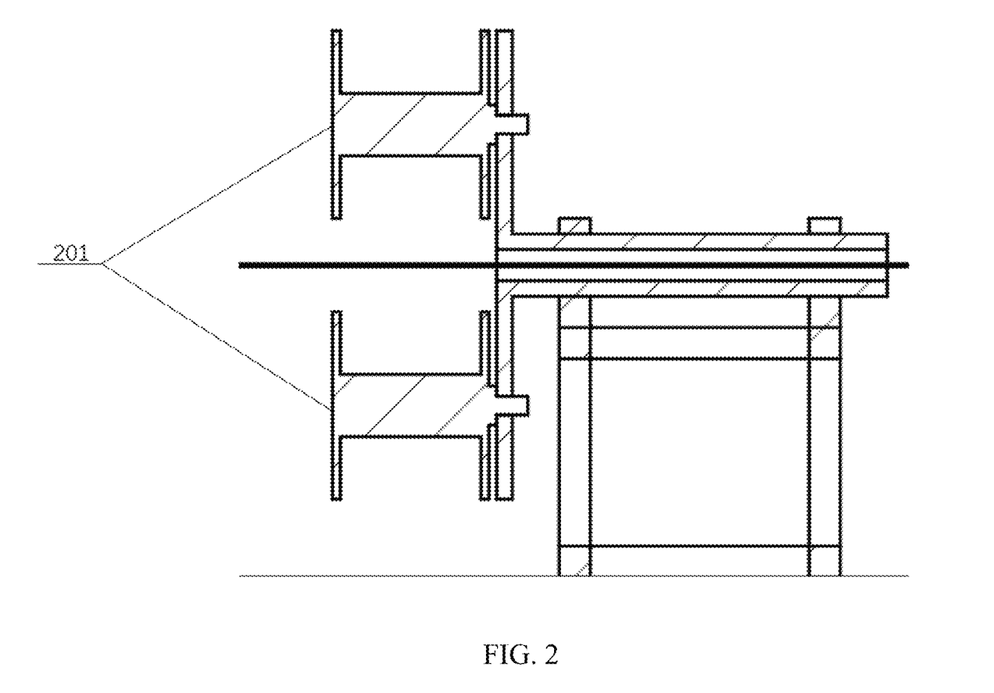
FIG. 2 is a schematic structural diagram of a replaceable resin filament rotary wrapping module.
Figure 3:
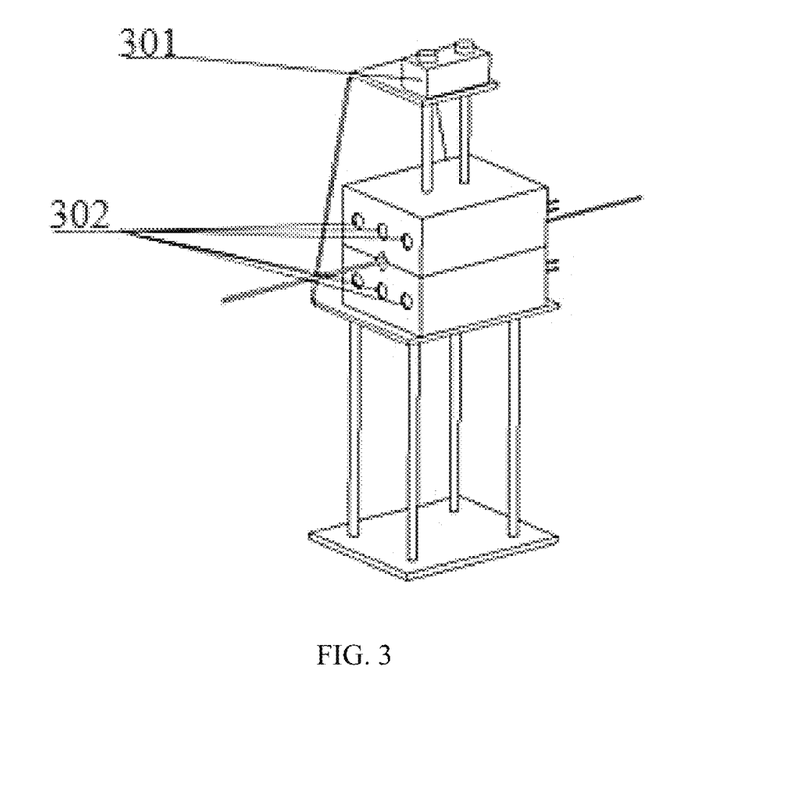
FIG. 3 is a schematic structural diagram of a melt preheating chamber.
Figure 4:
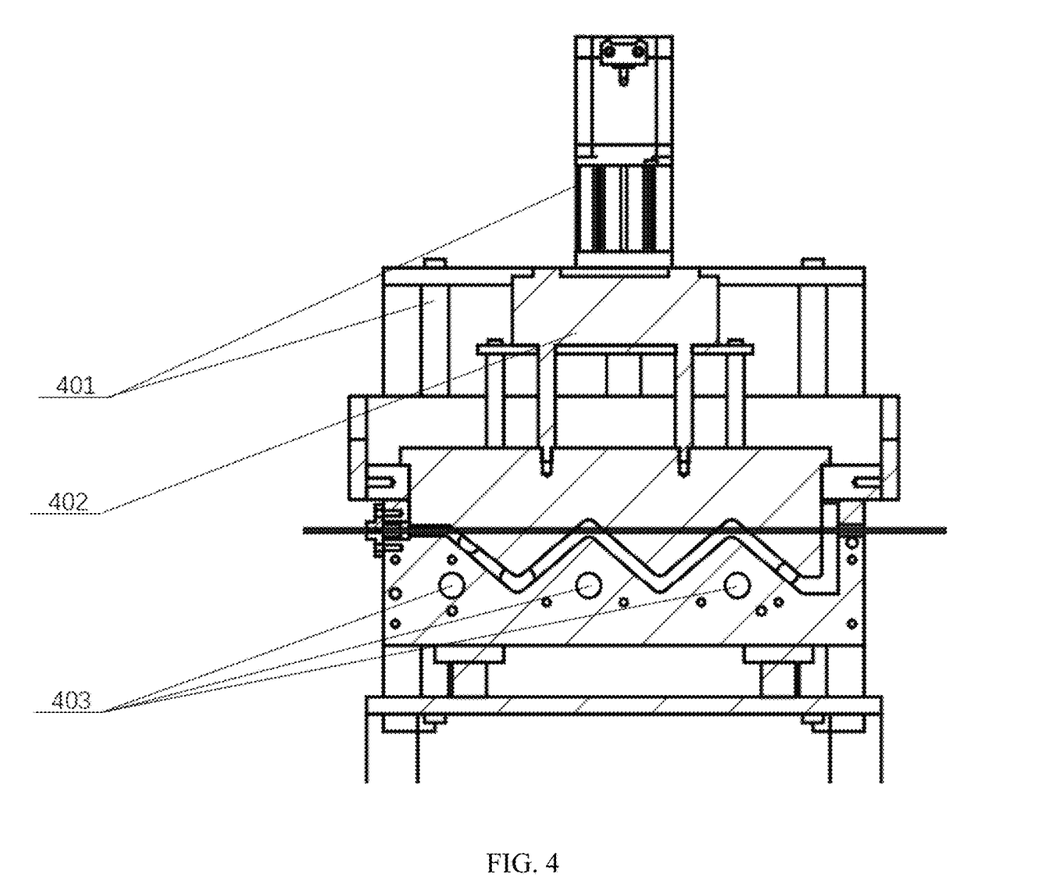
FIG. 4 is a schematic structural diagram of a curved channel impregnation chamber.

As shown in FIG. 1, the present invention provides an on-orbit composite filament forming device for space 3D printing. The forming device includes a constant tension unwinding module 1, a replaceable resin filament rotary wrapping module 2, a melt preheating chamber 3, a curved channel impregnation chamber 4, a variable aperture resin recovery device 5, a heat protective housing 6, a convective cooling device 7, a traction device 8, and a winding device 9 arranged sequentially.

As shown in FIG. 1 to FIG. 5, the replaceable resin filament rotary wrapping module 2 includes an active unwinding reel 201. The melt preheating chamber 3 includes a mechanical lifting device 301 and a heating resistor 302. The curved channel impregnation chamber 4 includes a primary lifting device 401, a secondary lifting device 402, and a heating resistor 403. The variable aperture resin recovery device 5 includes a first metal scraper mechanism 501, a second metal scraper mechanism 502, a third metal scraper mechanism 503, a circumferential heating resistor 504, a lateral push device 505, a connecting rod 506, rotating blades 5011, first rotating shafts 5012, second rotating shafts 5013, and an opening and closing connecting rod 5014.

Figure 5:
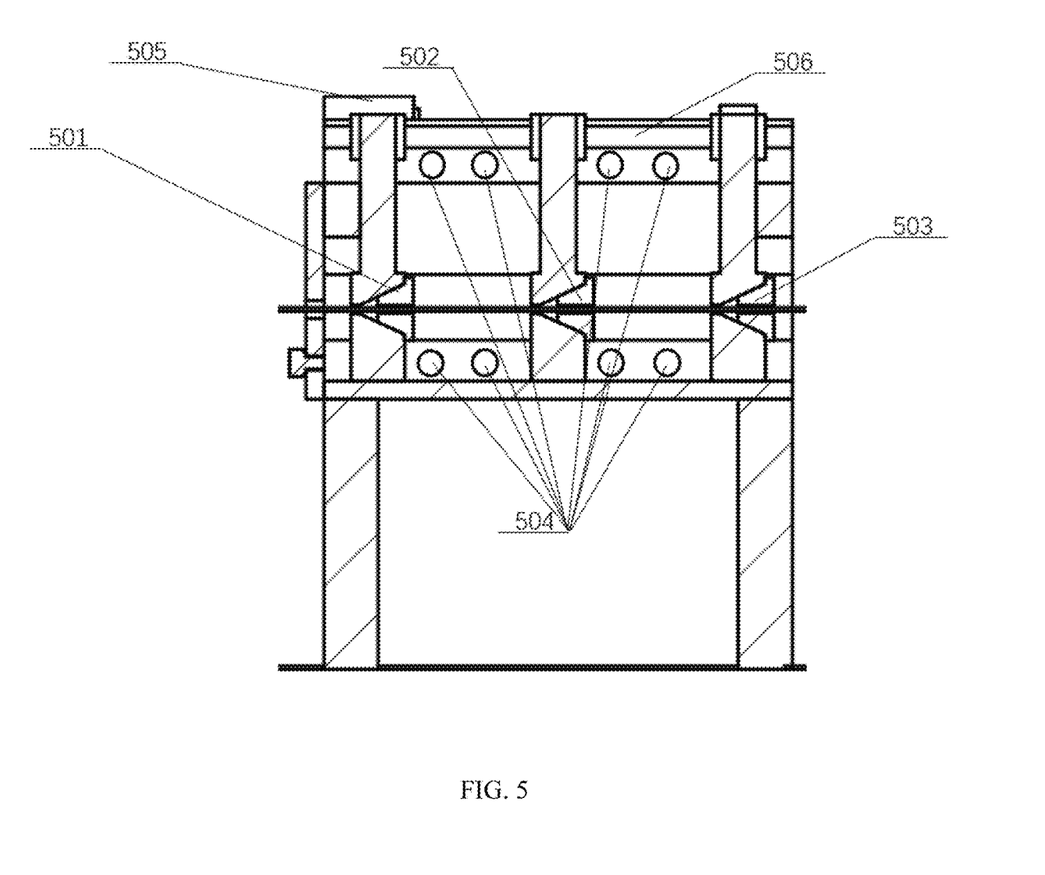
FIG. 5 is a schematic structural diagram of a variable aperture resin recovery device.

A top of each metal scraper mechanism is connected to the lateral push device 505 through the connecting rod 506.

Figure 6:
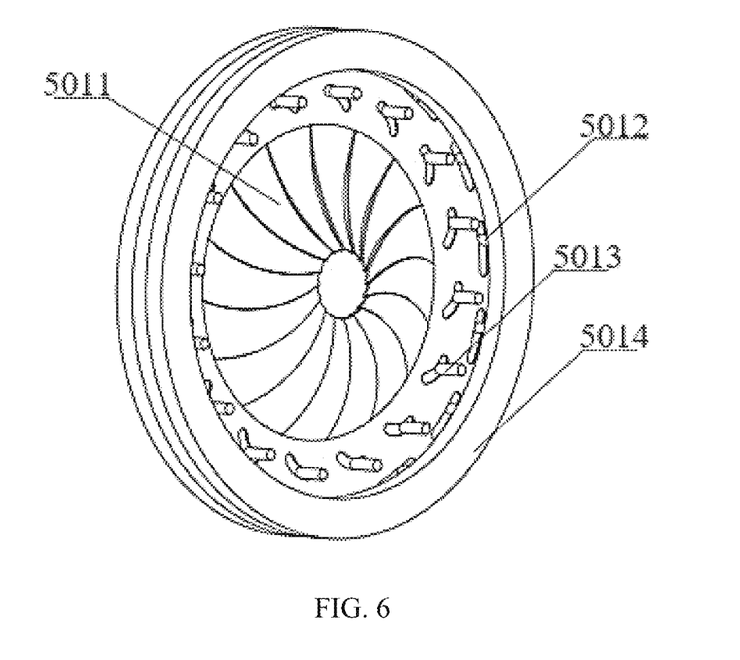
FIG. 6 is a schematic structural diagram of a first metal scraper opening and closing mechanism.

The first metal scraper opening and closing mechanism 501, the second metal scraper opening and closing mechanism 502, and the third metal scraper opening and closing mechanism 503 have a same structure and an opening and closing diameter in a range of 0-1.5 mm, and the diameters of openings of the metal scraper mechanisms decrease sequentially along a direction of movement of a filament in the process of filament forming. A plurality of rotating blades 5011 are provided inside the first metal scraper opening and closing mechanism 501, tails ends of the rotating blades are respectively connected to the first rotating shafts 5012 and the second rotating shafts 5013 capable of sliding in corresponding rails, the first rotating shafts 5012 are jointly connected to the rotary connecting rod 5014, rotation of the rotary connecting rod 5014 can drive the first rotating shafts 5012 to move in the slide rails, and the second rotating shafts 5013 also move in the corresponding slide rails due to the constraints of movement conditions, thereby driving the rotating blades 5011 to rotate relative to themselves, and realizing opening and closing functions.

Meanwhile, this embodiment provides a specific process for filament fabrication using the aforementioned on-rail composite filament forming device:

The objective in this embodiment is to fabricate a continuous carbon fiber reinforced PEEK composite filament having a diameter of 1.3 mm.

The heat protective housing 6 is opened. The mechanical lifting device 301 in the melt preheating chamber, the primary lifting device 401 in the curved channel impregnation chamber, and the secondary lifting device 402 in the curved channel impregnation chamber are controlled to rise. The diameters of the metal scrapers 501, 502, and 503 of the variable aperture resin recovery device are adjusted to 5 mm. A carbon fiber is threaded out from the constant tension unwinding module 1, and passes through the replaceable resin filament rotary wrapping module 2, the melt preheating chamber 3, the curved channel impregnation chamber 4, the variable aperture resin recovery device 5, and the convective cooling device 7 sequentially to the traction device 8. The mechanical lifting device 301 and the primary lifting device 401 are controlled to fall, the heat protective housing 6 is closed, and the threading of the carbon fiber is completed.

Temperatures of the heating resistor 302 in the melt preheating chamber, the heating resistor 403 in the curved channel impregnation chamber, and the circumferential heating resistor 504 in the variable aperture resin recovery device are set to 360° C. The diameters of the metal scrapers 501, 502, and 503 of the variable aperture resin recovery device are adjusted to 1.7, 1.5, and 1.3 mm, respectively. The secondary lifting device 402 is controlled to fall, the convective cooling device 7 is turned on, and two resin filaments are pulled out from the active unwinding reel 201 of the rotary wrapping module and fixed to the carbon fiber. The speed of the traction device 8 is set to 10 mm/s, and the speed of the replaceable resin filament rotary wrapping module 2 is set to 10 r/min.

The technical means disclosed by the solutions of the present invention are not limited to these disclosed in the above embodiments, and further include technical solutions formed by any combination of the above technical features.

What is claimed is:

1. An on-orbit composite filament forming device for space 3D printing, comprising: a constant tension unwinding module, a replaceable resin filament rotary wrapping module, a melt preheating chamber, a curved channel impregnation chamber, a variable aperture resin recovery device, a heat protective housing, a convective cooling device, a traction device, and a winding device arranged sequentially, wherein the melt preheating chamber, the curved channel impregnation chamber, and the variable aperture resin recovery device are located in the heat protective housing; the replaceable resin filament rotary wrapping module comprises at least one active unwinding reel placed on a circular rail centered on a carbon fiber; a first metal scraper opening and closing mechanism, a second metal scraper opening and closing mechanism, and a third metal scraper opening and closing mechanism are provided sequentially inside the variable aperture resin recovery device; a circumferential heating resistor is provided in a housing of the variable aperture resin recovery device, and a lateral push device is provided at an upper part of the housing of the variable aperture resin recovery device.

2. The on-orbit composite filament forming device for space 3D printing according to claim 1, wherein a mechanical lifting device is provided above the melt preheating chamber and connected to an upper cavity of the melt preheating chamber; a plurality of first heating resistors are provided in the melt preheating chamber.

3. The on-orbit composite filament forming device for space 3D printing according to claim 1, wherein the curved channel impregnation chamber comprises a channel top plate, an upper pressure block, a lower pressure block, and a channel bottom plate from top to bottom, wherein the upper pressure block and the lower pressure block extrude each other to form a wedge-shaped high-pressure impregnation zone, and a plurality of channel heating resistors are placed in the upper pressure block and the lower pressure block to maintain an internal temperature of a channel; a primary lifting device is connected to the channel top plate to lift a whole upper part of the channel, and a secondary lifting device is connected to the upper pressure block to press a melted filament to form the channel.

4. The on-orbit composite filament forming device for space 3D printing according to claim 1, wherein the first metal scraper opening and closing mechanism, the second metal scraper opening and closing mechanism, and the third metal scraper opening and closing mechanism have a same structure and an opening and closing diameter in a range of 0 mm-1.5 mm, and diameters of openings of the first metal scraper opening and closing mechanism, the second metal scraper opening and closing mechanism and the third metal scraper opening and closing mechanism decrease sequentially along a direction of movement of a filament in a process of filament forming, wherein a plurality of rotating blades are provided inside the first metal scraper opening and closing mechanism, tail ends of the plurality of rotating blades are respectively connected to first rotating shafts and second rotating shafts allowed to slide in corresponding rails, the first rotating shafts are jointly connected to a rotary connecting rod, a rotation of the rotary connecting rod is configured to drive the first rotating shafts to move in slide rails, and the second rotating shafts also move in the corresponding slide rails due to constraints of movement conditions, thereby driving the plurality of rotating blades to rotate, and realizing opening and closing functions.

5. The on-orbit composite filament forming device for space 3D printing according to claim 1, wherein an opening and closing controllable filament mold nozzle is provided at a front end of the variable aperture resin recovery device to control a formation of a recovered filament and a storage of a recovered resin.

6. The on-orbit composite filament forming device for space 3D printing according to claim 1, wherein a fan is provided on the convective cooling device to provide convection.

* * * * *